United States Patent
Chong et al.

(10) Patent No.: US 6,212,582 B1
(45) Date of Patent: *Apr. 3, 2001

(54) METHOD FOR MULTI-PRIORITY, MULTICAST FLOW CONTROL IN A PACKET SWITCH

(75) Inventors: Song Chong, Koyang (KR); Ramesh Nagarajan, Monmouth; Yung-Terng Wang, Marlboro, both of NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 08/999,311

(22) Filed: Dec. 29, 1997

Related U.S. Application Data

(63) Continuation-in-part of application No. 08/635,315, filed on Apr. 19, 1996, now Pat. No. 5,983,278.

(51) Int. Cl.[7] ...................................................... H04Q 11/04
(52) U.S. Cl. .............................. 710/57; 710/56; 709/234; 370/414; 370/444
(58) Field of Search .................................... 709/234, 207, 709/231, 232, 233, 235; 370/414, 444; 710/56, 57

(56) References Cited

U.S. PATENT DOCUMENTS

| | | | |
|---|---|---|---|
| 4,953,157 | 8/1990 | Franklin et al. ..................... 370/230 |
| 4,970,720 | 11/1990 | Esaki .................................... 370/416 |
| 5,434,848 | 7/1995 | Chimento, Jr. et al. ............. 370/232 |
| 5,546,389 | * 8/1996 | Wippenbeck et al. ................ 370/412 |
| 5,555,264 | 9/1996 | Sällberg et al. ...................... 370/414 |
| 5,619,500 | * 4/1997 | Hiekali .................................. 370/414 |
| 5,754,764 | * 5/1998 | Davis et al. .......................... 709/250 |
| 5,771,231 | * 6/1998 | Watanabe ............................. 370/377 |
| 5,802,278 | * 9/1998 | Isfeld et al. .......................... 709/249 |
| 5,983,278 | * 11/1999 | Ching et al. ......................... 709/235 |

* cited by examiner

Primary Examiner—Eddie Chan
Assistant Examiner—Gautam R. Patel

(57) ABSTRACT

A method for controlling data packet traffic flow over a bus interconnecting two or more nodes in a data communication system, each node having a unique address associated therewith and having a respective buffer memory for temporarily holding incoming data communicated thereto, each node further being capable of multicast sending of data packets over the bus to one or more nodes having respective addresses logically associated a unique address, the method comprising: checking current available buffer memory occupancy upon receipt of a data packet, the node being capable of outputting for transmission on the bus a first flow control indicator message when the data temporarily stored in the buffer memory is above a first buffer occupancy threshold associated with data of a first priority type, and a second flow control indicator message when the data temporarily stored in the buffer memory is above a second buffer occupancy threshold, the second buffer occupancy threshold being greater than the first occupancy threshold; implementing logical flow control to prevent transmission of data packet traffic of the first priority from one or more sending nodes to two or more receive nodes logically associated with the outputting node at the priority in response to receipt of the first flow control indicator message; and, implementing physical logical flow control to prevent transmission of data packet at any data traffic priority in response to receipt of the second flow control indicator message.

6 Claims, 4 Drawing Sheets

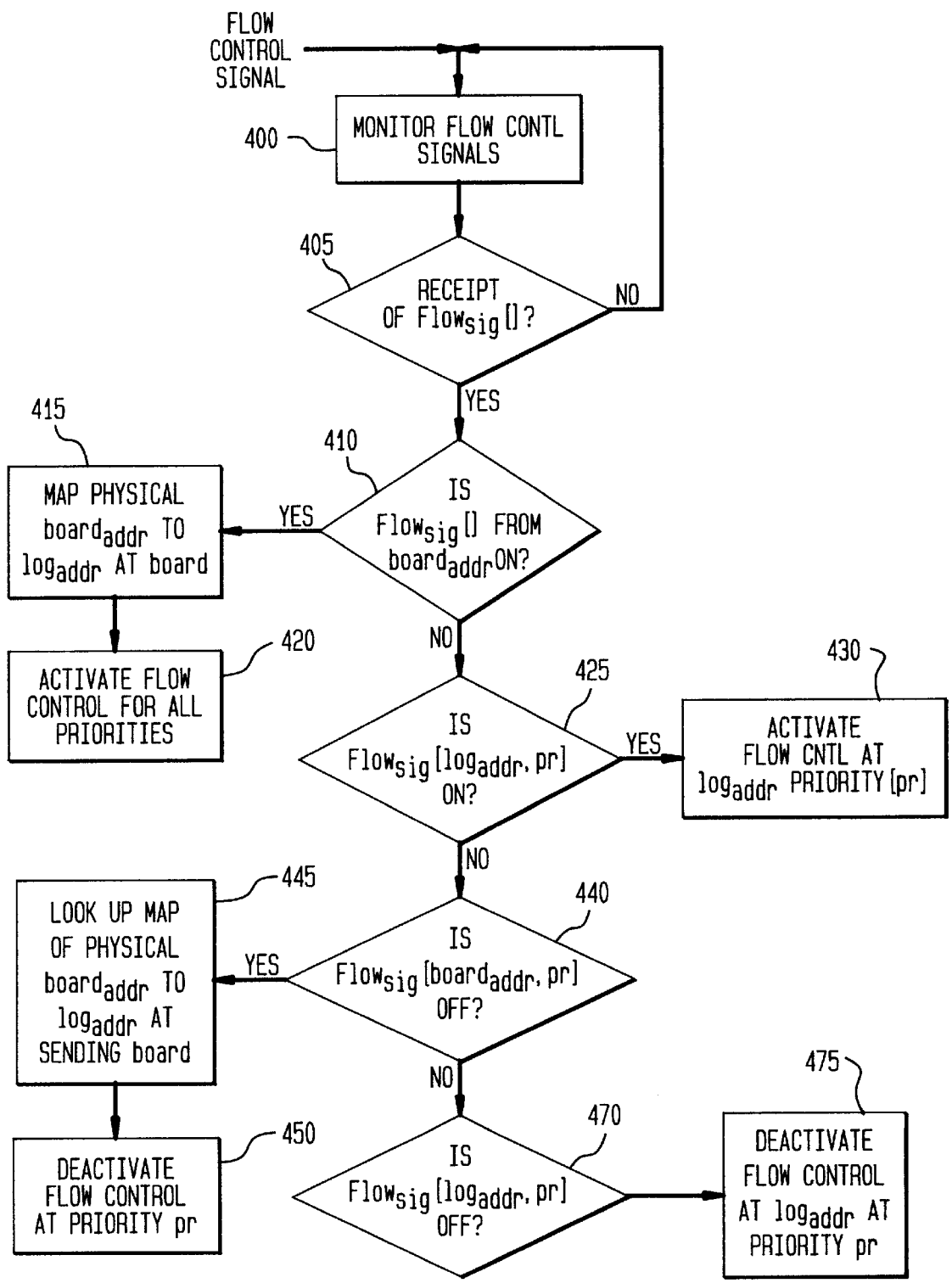

METHOD FOR MULTI-PRIORITY, MULTICAST FLOW CONTROL IN A PACKET SWITCH

RELATED APPLICATIONS

The application is a continuation-in-part application of U.S. patent application Ser. No. 08/635,315 filed Apr. 19, 1996, now U.S. Pat. No. 5,983,278, the contents and disclosure of which are incorporated by reference herein.

FIELD OF THE INVENTION

The present invention relates to a packet switching hub, and, more particularly, to flow control techniques for multi-priority, multicast traffic.

BACKGROUND OF THE INVENTION

The past years have witnessed a tremendous increase in the traffic volumes in both WANs like the Internet and also on-premise LANs like the Ethernet. This increase in traffic volume is due to new technologies, migration from a paradigm of central to distributed computing and a host of new applications. Also, the fast pace of technology growth is witnessing increasingly inter-disciplinary work in which groups of individuals from diverse groups/divisions come together for a project and disband. From a networking standpoint, this implies that the typical communities of interest (COI) such as a department no longer are the rule and in fact these COI are regularly changing. This results in severe network management problems. In addition to traffic volumes and network management problems there is also a bewildering variety of co-existing applications such as telephony, video and data networking. The seamless integration of these services poses an extreme challenge in both the premises network and the wide-area network. This has resulted in a dramatic shift from the present method of operation which typically involves routers and bridges to switching in the premises.

A type of switch architecture that has been considered is a dual-bus-based one with bus slots supporting various port cards that interface to the external world. FIG. 1 illustrates the switching hub architecture 10 including a switch fabric which is a dual-bus architecture where all port boards 25a, 25b, ..., 25n transmit on a transmit bus 30 and receive from a separate receive bus 40. The transmit bus 30 is looped back onto the receive bus 40 through a loop-back circuit 45 located at the far end of the bus. In the example configuration of FIG. 1, the busses run at multi-Gbps speed, supporting port cards with aggregate rates up to OC-12. The port cards 25a, 25b, ..., 25n are likely to have various interfaces ranging from CBR circuits like T1.5, Ethernet segments, ATM connections to desktops etc. In particular, such an architecture (or like) is considered as an attractive solution for access and backbone in campus, private or corporate networks.

Access to the bus is achieved via a variation of a round-robin discipline with priorities. Transmission on the bus is in units of envelopes which are ATM cells, e.g., wrapped in some local switch fabric headers which includes sequence numbers, flags and addressing information among other. It is assumed bus collision avoidance is accomplished by a suitable bus arbitration mechanism. The switching architecture could be employed to switch variable-sized as well as fixed size packets. On each visit of the poll to a port card, it is assumed that only one envelope is served. This is sufficient to maintain high throughput in a short backplane because the propagation delay is small and envelope transmission and arbitration by polling can be completely pipelined.

Referring back to FIG. 1, each port card 25a, 25b, ..., 25n interfaces to the bus via a high-speed chip indicated as respective BIC (Bus Interface Chip) chips 50a, 50b, ..., 50n that are assumed to have simple high-speed FIFO staging buffers 60a, 60b, ..., 60n, respectively, for transmission on the unidirectional bus 30 and receipt from the unidirectional bus 40. The port cards 25a, 25b, ..., 25n each contain a large amount of slow-speed memory, e.g., indicated as RAM 75a, 75b, ..., 75n to serve as the primary buffering area to and from the actual physical ports represented as input and output arrows 31 to and from each respective RAM. Thus, the function of the BIC memory space 60a, 60b, ..., 60n is to serve as a staging area for envelopes generated on the transmit side and as a rate-converter (from the bus transmission rates to the port transmission rates) on the receive side. Due to the large potential difference in rates between the bus speed and port rates, buffer overflows are a serious issue on the receive side of the BIC.

Routing in the fabric is achieved based on a logical addressing scheme whereby an address is assigned to each "logical" egress point which represents either a port card, in which case it will be referred to as a physical address as well, a port or even an ATM connection (VP/NVCI). Note that no source addressing is used in the switch, and hence all addresses refer to an egress point. As mentioned above, this logical (physical) address is part of the local envelope header. On the receive side, BICs use this address to filter envelopes destined to them.

There are many simple techniques for implementing physical flow control schemes for unicast-type traffic, e.g., by sending out a control packet or envelope containing buffer congestion indication to the sending BIC board and, for deactivating such flow control for unicast streams by sending a flow control packet that signals deactivation for streams destined to a particular physical address. However, multicast traffic, i.e., where ATM cell traffic is sent from a single source to multiple port boards, has its unique flow control problems. In multicast, routing is accomplished by simply assigning the same logical address to multiple physical entities (ports or boards).

Since the receiving BICs are potentially distinct in their traffic patterns and congest and un-congest independently, flow control is complicated. There are several known flow control strategies, ranging from simple strategies to sophisticated strategies. Simple strategies includes transmitting at a source to conform to the slowest receiver, i.e., the sender flow controls whenever any receiver is congested. Sophisticated strategies include flow control by the sender only when a significant number of receivers are congested. Strategies of the latter type are aimed at feeding the uncongested receivers at the fastest rate possible and not penalizing them for congestion at the slower receivers. However, they suffer from the disadvantage that a reliable multicast service will now require retransmissions to the slower receivers at a later time to overcome the losses. Sophisticated schemes are too complicated to implement at the BIC level and hence a simplistic flow control strategy is desired to operate multicast control at the sender when any receiving BIC is congested and de-controlling only when all the BICs are uncongested.

It would thus be highly desirable to provide a simple flow control mechanism by which congestion status of BICs receiving multicast streams may be determined and which may be appropriately used to de-control the sender.

SUMMARY OF THE INVENTION

The present invention is an extended hybrid flow control mechanism that supports bandwidth priorities under flow control and also provides appropriate mechanisms for both unicast and multicast traffic control. As described herein, the term flow control is used to reflect control of streams within the fabric in order to manage the high-speed buffers. The extended hybrid flow control mechanism of the present invention is based on multiple pairs of buffer-occupancy thresholds. Each priority is associated with a different pair of thresholds, a high threshold activating flow control logically and a low threshold deactivating flow control physically for unicast streams and logically for multicast streams at that priority. With physical control, all streams destined to the receiver triggering the control are simultaneously controlled and de-controlled. With logical control, streams are selectively controlled based on their rates and then de-controlled. In addition to the multi-pairs of buffer occupancy thresholds, a top occupancy additional threshold is positioned to shut down all priority streams simultaneously based on the physical address of the congested buffer. This threshold is designed to protect against buffer overflows and hence losses. By properly positioning these thresholds, strict delay-priorities among streams may be achieved while maintaining negligible loss, high throughput and fair sharing of bandwidth among streams of the same priority.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF DRAWINGS

FIG. 5 is a flow chart indicating the protocol implemented by each BIC upon receiving flow control signals.

DETAILED DESCRIPTION OF THE INVENTION

Co-pending U.S. patent application Ser. No. 08/635,315, now U.S. Pat. No. 5,983,278, entitled "Multi-priority Data Flow Control Techniques", the contents of which are incorporated herein by reference and commonly assigned as the instant invention, describes a variety of physical and logical flow control techniques including a combination physical and logical, i.e., "hybrid", flow control mechanism that requires a minimum amount of high-speed buffer while maintaining negligible loss, high throughput and "fair" bandwidth sharing among unicast streams. Specifically, the hybrid flow control mechanism described applies to single and multiple priority, unicast traffic (i.e., traffic between a single sender and single receiver). The philosophy of the hybrid flow control in supporting multiple priorities is that high-priority streams are not controlled (and hence not delayed) unless they are responsible for congestion, whereas the low-priority streams are immediately controlled. It is a desirable scheme since it isolates high-priority streams from congestion-causing low-priority streams and keeps the flow of high-priority streams intact. To achieve this goal, the hybrid control scheme is designed to shut off low-priority streams first and delay the control of high-priority streams until it is necessary. Thus, the scheme implements multiple pairs of buffer-occupancy thresholds with each pair corresponding to a supported fabric priority.

Figure 2:
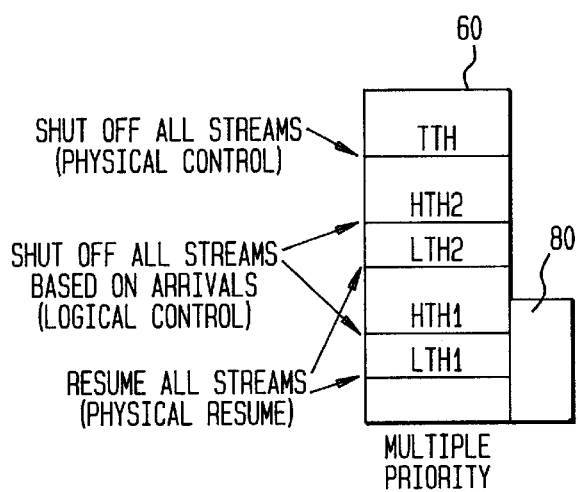
FIG. 2 is an illustration of queue envelope occupancy thresholds for staging buffer in the switched architecture implementing the extended hybrid control of the invention.

FIG. 2 illustrates a multiple-priority queue occupancy threshold scheme with an example of a 2-priority case. The high and low-thresholds for priority 1 (low priority) are designated as queue threshold levels $HTH_1$, $LTH_1$ and are positioned below the buffer pair for priority 2 (high-priority) denoted by $HTH_2$, $LTH_2$, respectively. As the buffer occupancy in a receiving BIC buffer exceeds $HTH_1$, logical control is activated at priority 1. In spite of the control of priority 1 streams, if the occupancy further increases and exceeds $HTH_2$ logical control at priority 2 is also activated. By doing so, priority 2 streams are controlled only when the control at priority 1 is insufficient. It should be understood that a hysteresis is built into the buffer occupancy thresholds for each priority, e.g., between $HTH_1$ and $LTH_1$, to assure that a BIC queue won't build up and reject packets immediately after flow control is deactivated and vice-versa.

In one advantageous embodiment of the foregoing approach, logical streams are "implicitly" selected for control based on their arrival rates. Once logical control is activated at a particular priority, streams of that priority are shut down sequentially in the order at which their envelopes appear at the congested receiving board. Thus, high-rate streams are more likely to be controlled than low-rate streams since there is a greater probability that a high-rate stream will appear at a BIC than a low-rate stream. When a receiving buffer's occupancy exceeds a top threshold level TTH, greater than the highest priority high threshold, a flow control message is transmitted and all streams at all priorities are shut off to the receiving buffer's physical address.

This hybrid flow control scheme provides various features including preventing cell loss on the receive BIC buffers; maintaining a high throughput; achieving MAX-MIN fairness in bandwidth allocation among streams if enough access bandwidth is available to the streams; prohibiting high-rate streams from unfairly starving low-rate streams which are subject to an access bandwidth constraint; maintaining a low switching delay; requiring minimum utilization of bus bandwidth, BIC buffer space and BIC processor for control purposes; and, being simple to implement at the BIC and operate at high data rates up to the bus speed.

The instant invention is an extension of the hybrid flow control mechanism as described in co-pending U.S. patent application Ser. No. 08/635,315, now U.S. Pat. No. 5,983,278, that has been modified to support multicast, multi-priority traffic. In the extended hybrid control scheme for supporting multiple priorities and multicast traffic in the fabric, several advantages in performance over the art are achieved.

First, a delay-priority is realized among given priority classes in the fabric. The extended hybrid control scheme of the present invention refrains from controlling high-priority streams (and hence not delayed) unless they are responsible for congestion. Thus, for example high-priority CBR traffic will not experience any unnecessary delay/jitter even during a congestion period as long as low-priority ABR traffic is responsible for the congestion.

Another performance advantage of the present invention is the efficient use of the receiving BIC buffer among the priority streams. As a result the amount of high-speed buffer needed on the receiving boards is kept to a minimum. One cost-effective buffer management solution is to use a common buffer that is completely shared by all the priorities.

A third advantage of the present invention is the use of a simple control mechanism even for multicast streams. In accordance with the present invention, flow control is activated when any single receiving BIC in the multicast group is congested. Deactivation occurs when all receiving BIC's are uncongested. This obviates the need for the sending board to maintain information on successful transmissions to individual ports of the multicast tree and separately re-transmit any lost data to individual parts.

In addition, the extended hybrid scheme of the present invention maintains the desirable properties of the original hybrid scheme for single-priority unicast streams as summarized herein above.

Figure 3:
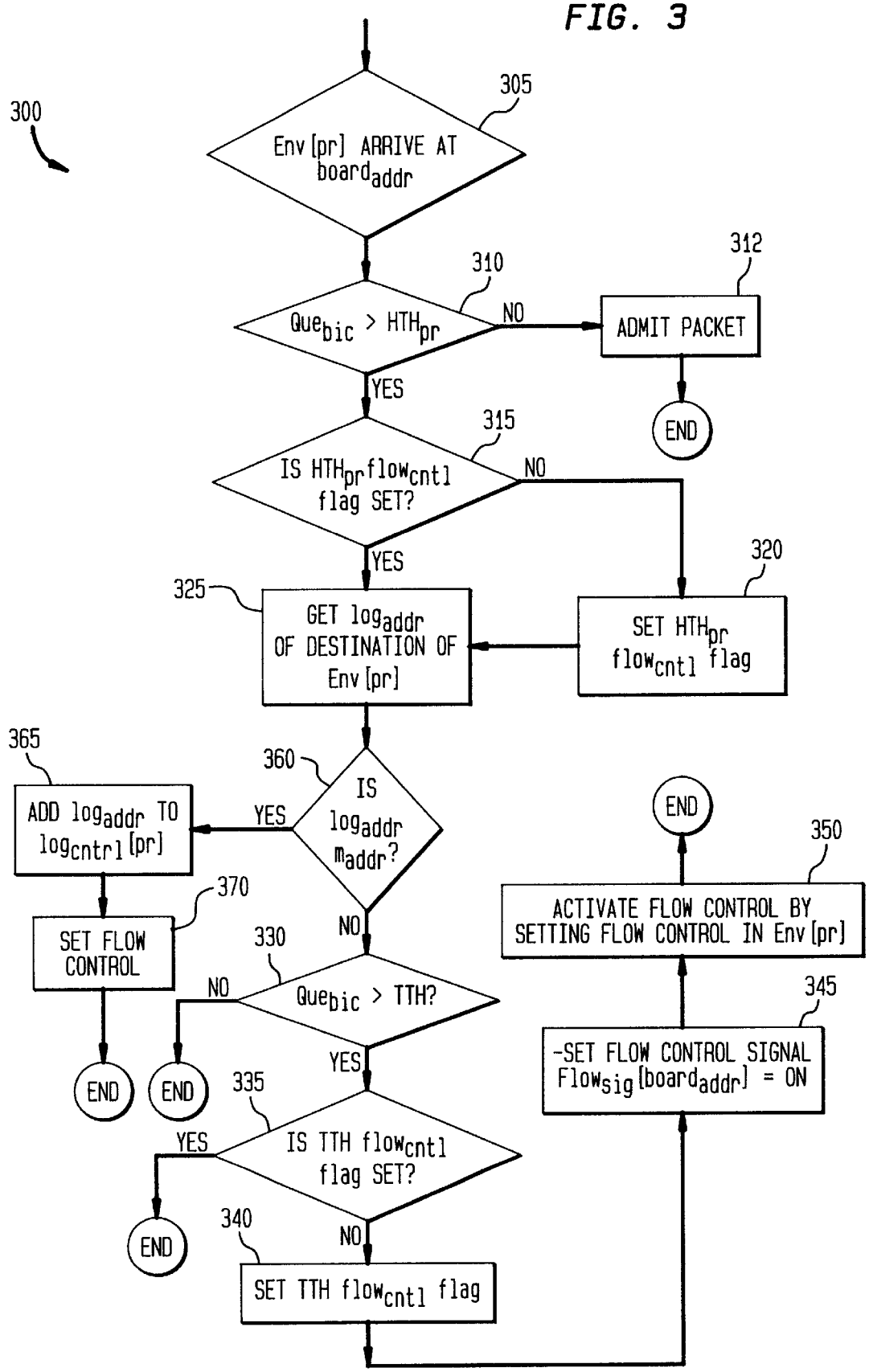
FIG. 3 is a flow chart indicating the BIC protocol for activating flow control of multi-priority, multicast streams.
Figure 4:
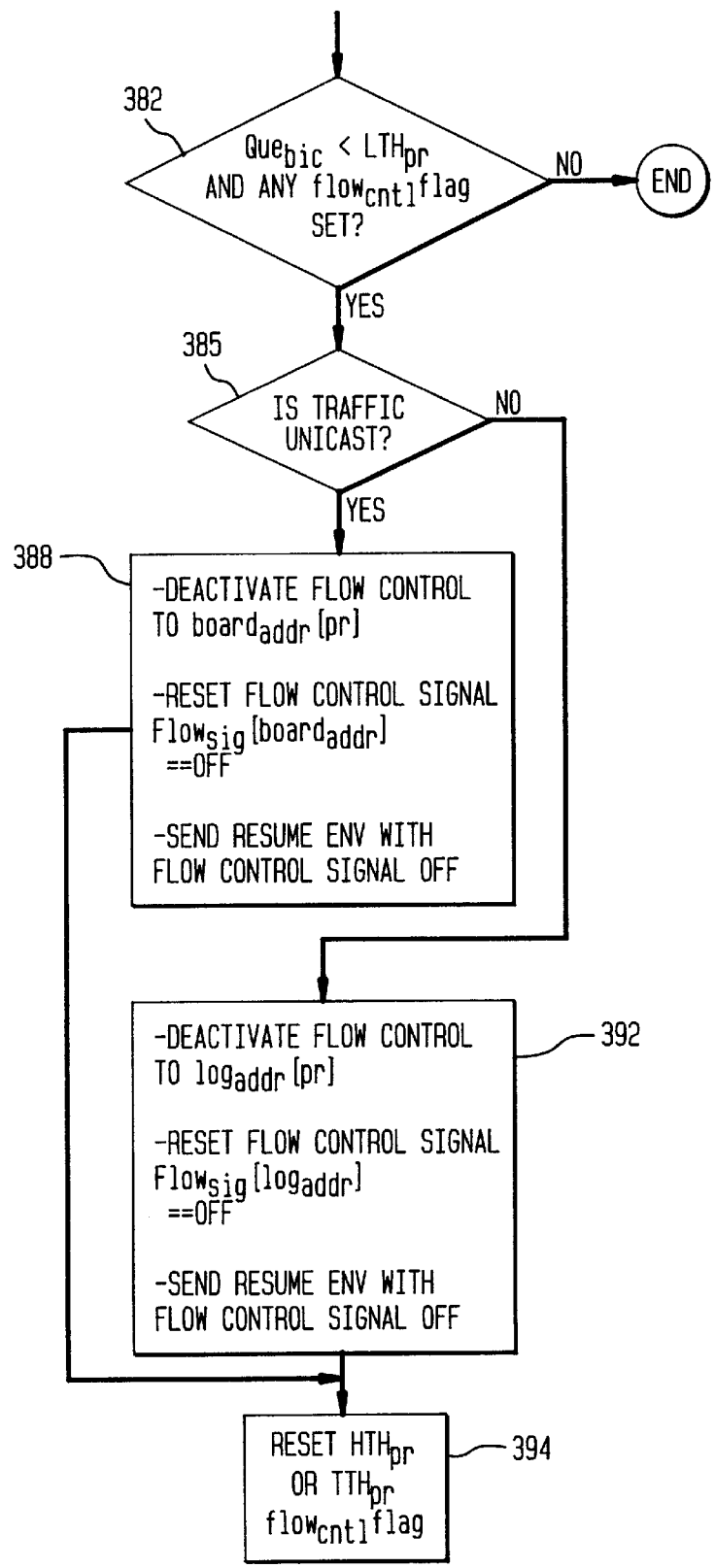
FIG. 4 is a flow chart indicating flow control deactivation as each receiver BIC becomes uncongested.

The following terminology as defined will be useful when referring to FIGS. 3 through 5 and the description herein.

| | |
|---|---|
| addr: | denotes a physical or logical address; |
| maddr: | denotes a logical multicast address; |
| board$_{addr}$: | denotes the physical address of a port board; |
| log$_{addr}$: | denotes the logical address of a physical entity (e.g., port or VC); |
| Env[log$_{addr}$, pr]: | denotes the logical address of the destination of a priority "pr" envelope; |
| Flow$_{sig}$[addr, pr]: | the address (physical or logical) which is congested and its priority (applies only to logical control); |
| Log$_{map}$[board$_{addr}$]: | a function that maps a physical board address to the logical destination addresses at that board; |
| Log$_{cntrl}$[pr]: | a list of logical addresses that are being flow controlled at priority pr, i.e., the traffic to these addresses is being controlled; |
| | Que$_{bic}$: the queue occupancy at the receiving side of the BIC in envelopes |
| UNICAST-STREAMS[pr]: | a boolean variable that indicates the presence of unicast streams of priority pr at a board; |
| MULTICAST-STREAMS[pr]: | boolean variable that indicates the presence of multicast streams of priority pr at a board. |

Referring to FIG. 3 protocol 300 is shown which is implemented by a receiving BIC upon the arrival of an envelope. At step 305 a decision is made as to whether an envelope of a particular priority pr has arrived at a BIC port from the bus. A staging buffer congestion status inquiry is always made after an envelope arrives at a BIC port from the bus. Thus, at step 310, a determination of the congestion status of the receiving BIC is made, i.e., whether the current queue occupancy Quebic at the receiving side of the BIC in number of packets is greater than the high-threshold level for that priority HTH$_{pr}$. If the number of packets is not greater than the high-threshold level for that priority HTH$_{pr}$, then the received data packet may be admitted to the BIC staging buffer as indicated at step 312. If the number of packets is greater than the high-threshold level for that priority HTH$_{pr}$, logical address flow control for that priority is to be activated. Thus, a determination is made at step 315, as to whether logical flow control has already been activated, i.e., whether an HTH$_{pr}$flow$_{cntl}$ flag that is monitored by the controlling processor (not shown) at that port card has been set. If an HTH$_{pr}$flow$_{cntl}$ flag had not been set, then, at step 320 the controlling processor will set the HTH$_{pr}$flow$_{ctl}$ flag. At step 325, the processor will additionally determine the destination of the Env[pr] so as to enable flow control of traffic destined to that logical address (log$_{addr}$) of priority pr.

The consequence of the foregoing steps is to first determine upon receipt of an envelope of a given priority, whether the buffer has exceeded the high threshold for that priority, and if so to activate flow control. Since only logical flow control is activated at this point, the logical 10i address of the stream is obtained. As a result the subject receiving BIC is in a position to instruct the BIC that is sending this logical address to stop. However, if the logical address is a multicast address, flow control activation requires one additional step.

Multicast streams are logical streams that are only logically controlled. Control activation works similar to control activation of unicast streams except that the receiving BIC must keep track of all logical addresses and their respective priorities. This is shown in FIG. 3 by steps 360, 365, and 370. The list of multicast addresses is necessary in order to properly deactivate control for the multicast stream as discussed further, below.

For unicast streams, tight control of packet loss can be enhanced through physical control. Thus, a top threshold, TTH, is provided on the top of all other thresholds, as shown in the example buffer queue occupancy threshold model of FIG. 2. The physical control is only activated when the logical control is unable to limit the buffer occupancy and hence the occupancy exceeds TTH. Once activated, the physical control simultaneously shuts down all the logical streams at all the priorities by blocking all streams whose destination address is the physical address of the receiving port card in consideration. For the implementation of physical control in the extended hybrid scheme, all the port boards in the fabric must be addressed distinctively. This can be accomplished, for example, by adding an additional bit to the address field in a flow control message to indicate a physical or logical address or, by simply reserving a portion of the logical address space for physical port board addresses. Consequently, the flow control message can signal either a physical or logical address. In addition each BIC is able to map a physical board address to a set of logical destination addresses for the board at that physical address, such as for example using the Log$_{map}$[board$_{addr}$] function defined above. In this way the sending BIC can determine which logical addresses to shut down so as to shut down all traffic to the receiving board whose congestion has exceeded its TTH. Likewise, this mapping function will be used by the sending BIC when it receives a flow control OFF signal from a particular BIC physical address.

Thus, referring back to FIG. 3, regardless of whether logical flow control is already implemented a determination is made at step 330, as to whether the current queue occupancy Que$_{bic}$ at the receiving BIC is greater than the top-threshold level TTH for that BIC board. If the current queue occupancy Que$_{bic}$ is greater than TTH, physical control for that board is required.

The process continues at step 335, where a determination is made as to whether physical flow control has already been implemented. If a TTH$_{pr}$flow$_{cntl}$ flag had been set, then, the receiver protocol ends. If a TTH$_{pr}$flow$_{cntl}$ flag had not been set, then, at step 340 the controlling processor will set the TTH flow$_{cntl}$ flag. At step 345, the processor will also set the flow control signal Flow$_{sig}$[board$_{addr}$], to indicate to all sending boards that no traffic is to be sent to this physical board address. Particularly, a Flow$_{sig}$[board$_{addr}$] set to ON, e.g., a logic 1 bit, will indicate flow control activation due to receive board congestion, and a Flow$_{sig}$[board$_{addr}$] set to OFF, e.g., a logic 0 bit, will indicate will indicate flow control deactivation. Thus, as indicated at step 350, the receiving BIC will set a Flow$_{sig}$[board$_{addr}$] bit at the received envelope having flow control information, e.g., by implementing a logical OR, with the Flow$_{sig}$[board$_{addr}$] bit of the received envelope. The flow control information is included in the received envelope and forwarded along the bus to the next BIC. As described herein, a sending BIC board monitoring a flow control header of this envelope will shut off all unicast streams of any priority destined to the receive board address when a flow control signal Flow$_{sig}$[board$_{addr}$] is set.

Figure 1:
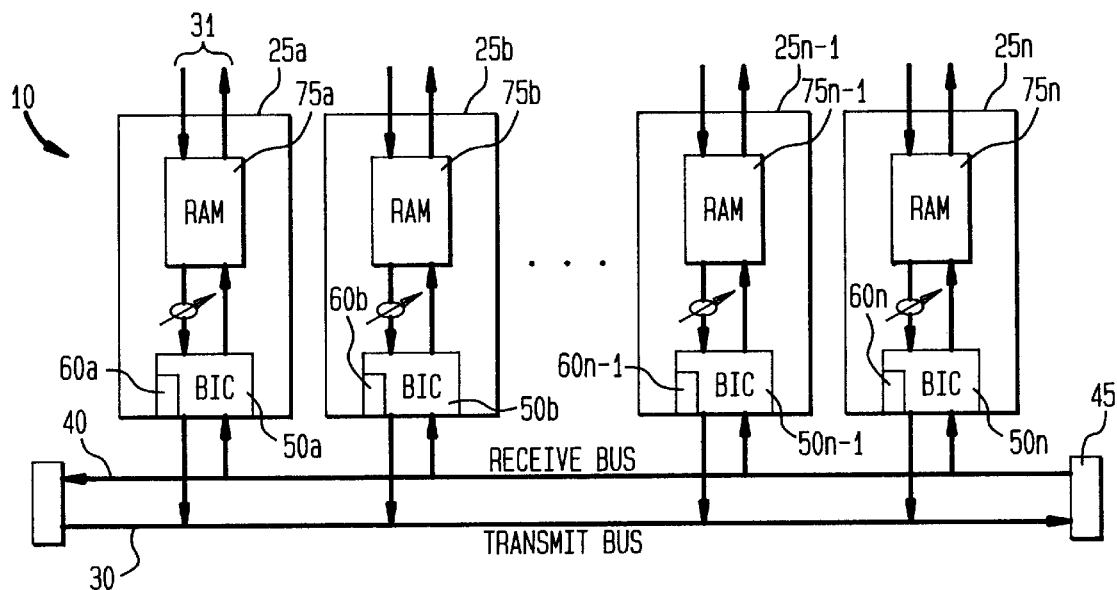
FIG. 1 is a general diagram illustrating dual-bus based ATM switch architecture with bus and port boards.

The resumption of controlled streams, i.e., flow control deactivation, is described in connection with FIG. 4 and is done physically for unicast streams and logically for multicast streams. Particularly, as shown in FIG. 1, buffers become uncongested as data flows from the temporary staging buffer of a port card, e.g, 50a, to the slow speed RAM memory, e.g., 75a, of the BIC board. As will be explained, the mechanism for de-activating flow control is distributed among the plural BIC boards, i.e., each board monitors itself and will generate a RESUME envelope to itself and insert a flow control OFF signal. A BIC card's indication of its buffer's congestion status in a Flow Control indicator bit in the RESUME envelope may be implemented logically, e.g., by enabling the BIC to "OR" its own congestion status indication, e.g., $HTH_{pr}flow_{cntl}$ with the Flow Control indication in the envelope from the previous BICs. Only when all BIC receive boards of that logical address are in agreement, i.e., become uncongested, will flow control de-activation be initiated.

For transmission of the RESUME envelopes, there is a separate high-speed staging buffer in the BIC, which is referred to as the control buffer 80 as illustrated in FIG. 2. RESUME envelopes have priority over ordinary data envelopes to access the bus. Among the boards with queued RESUME envelopes, bus access is arbitrated via a round-robin discipline.

FIG. 4 illustrates the distributed flow control de-activation protocol implemented by each receiver BIC when it becomes uncongested. As an envelope of a given logical address and priority pr leaves the high speed BIC buffer for the slower RAM as shown at step 382 a determination is made as to whether the current queue occupancy $Que_{biC}$ is less than the lower-threshold level LTH for that priority pr, in which case deactivation of flow control for that priority is warranted. Thus, if the band has dropped below $LTH_{pr}$ and control is on for that priority level, then a determination is made at step 385 as to whether that logical address was unicast traffic. Here is where the logical list described above, is utilized. The receiving BIC looks at the control list to see whether the logical address of the departing envelope is entered. If it appears on the list, the stream is multicast. Otherwise, the stream is unicast. If it was unicast traffic, then the receiving BIC writes a flow control signal OFF into its RESUME envelope, indicating to the sending BIC to resume all traffic at priority pr to the receiving BIC's physical address. This is shown at step 388. This entails re-setting a $Flow_{sig}[board_{addr}, pr]$ status bit in the RESUME envelope to indicate that flow control to the $board_{addr}$ is to be de-activated. The process continues to step 394 to reset either the $HTH_{pr}flow_{cntl}$ or $TTH_{pr}flow_{cntl}$ status flags, or both of them, whichever have been previously set for that board.

If it is determined at step 388 that the departing traffic was a multicast address then the receive board will send out a signal indicating that flow control is to be de-activated for that address at that priority. In the multicast case, deactivation of flow control status may only occur when all receive BICs (in the Multicast session) are uncongested. Specifically, as shown in FIG. 4, at step 392, the receiving BIC will first reset the flow control signal $Flow_{sig}[log_{addr}]$ bit to logic 0, i.e., OFF, and will generate a RESUME envelope destined to the logical multicast address of which it is associated. Thus, each receiving BIC associated with that logical address will receive the RESUME envelope. In order to deactivate flow control, it is required that the receive buffers at every physical card associated with the logical multicast address ($M_{addr}$,pr) be uncongested. Thus, as each receive board becomes uncongested, it sends out a RESUME envelope that is to be monitored by the remaining receiving BIC buffers associated with the logical address ($M_{addr}$,pr). Specifically, each receiving board will indicate its own congestion status by either writing the $Flow_{sig}[log_{addr}]$ bit of the RESUME envelope to 1, indicating that its queue is congested, or, to 0, indicating that its queue is uncongested. This, can be done, for example, by implementing a logical OR, with the $Flow_{sig}[log_{addr}]$ bit of the received RESUME envelope. In this manner, monitoring of flow control signals is distributed, as the RESUME envelope passes on the bus to each receiving logically associated (multicast recipient) BIC, and each BIC, in turn, writes its flow control status on the envelope. Only when every receiving BIC that is logically associated with ($M_{addr}$,pr) is uncongested, will flow control be deactivated, i.e., $Flow_{sig}$ [$log_{addr}$] bit is OFF. It is readily understood that this distributed monitoring method obviates the need for sending BICs to continuously poll logically associated BICs to ascertain their associated status.

FIG. 5, illustrates the protocol implemented by each BIC sending unicast or multicast traffic in the extended hybrid flow control scheme of the invention. Specifically, each BIC monitors the envelopes that contain the flow control status bit $Flow_{sig}$[addr, pr]. For example, as indicated in FIG. 5, step 405, the sending board checks each passing RESUME envelope transmitted on the bus and checks the flow control information to determine the origin and status of the flow control signal. Particularly, at step 410, a determination is made as to whether the flow control signal indicates congestion at a physical port card address. If, the flow control signal indicates congestion at a physical port card address, i.e., $Flow_{sig}[board_{addr}, pr]$=ON, then at step 415, a function is performed to map that physical receiving board address to the logical destination addresses for that receiving board which are at that sending board so that the sending board will disable and prevent transmission of data traffic to that physical board, as indicated at step 420.

If, at step 410, it was determined that the sending BIC did not receive a flow control signal indicating a physical address, then a determination is made at step 425 as to whether the flow control signal indicated congestion at a logical address for a particular priority. If the received flow control signal indicated congestion at a logical address for a particular priority, i.e., $Flow_{sig}[log_{addr}, pr]$=ON, then, at step 430, the sending BIC activates flow control for that logical address at that particular priority. Consequently, there is no transmission of data traffic to any receive board associated with that logical address such as in the multicast case.

If, at step 425, it was determined that the flow control signal did not indicate congestion at a logical address for a particular priority, then, at step 440, a determination is made as to whether the flow control signal indicates deactivation of flow control at a particular physical board address for a particular priority, i.e., $Flow_{sig}[board_{addr}, pr]$=OFF. If the flow control signal indicates deactivation of all streams of priority pr to a receiving boards physical address, then at step 445, the sending BIC looks up its list of all logical streams for priority pr, mapped to that physical address. Flow control is deactivated at step 450 only for those mapped logical addresses at priority pr.

If at step 440, it is determined that the flow control signal does not indicate deactivation of physical control, at step 470 a determination is made as to whether the flow control signal indicates no congestion at a logical board address, i.e., $Flow_{sig}[log_{addr}, pr]$=OFF. If yes, then at step 475, the flow control is deactivated for the sending board sending data to that logical address. Note that this logical address can be a multicast or unicast address.

The foregoing merely illustrates the principles of the present invention. Those skilled in the art will be able to devise various modifications, which although not explicitly described or shown herein, embody the principles of the invention and are thus within its spirit and scope.

What is claimed is:

1. In a data communications system having a switch fabric and one or more port cards, each port card having associated therewith at least one logical address and a physical address, and having, or coupled to, a buffer, the buffer adapted for coupling to, or being integrated into, the switch fabric, the buffer having a buffer occupancy defined as the number of memory locations in the buffer is used for storing incoming data as compared to the total number of memory locations in the buffer, a method of controlling multipriority data flow through the buffer, the multipriority data comprising a plurality of data types including a first data type having a first priority and a second data type having a second priority lower than the first priority, the first data type including one or more first-priority bit streams, and the second data type including one or more second-priority bit streams, the method comprising the steps of:

(a) monitoring the occupancy of the buffer on the port card;

(b) if the occupancy exceeds a second threshold greater than a first threshold, then disabling transmission of all second-priority bit streams destined for at least one corresponding logical address of the port card until the buffer occupancy drops below the first threshold;

(c) if the buffer occupancy drops below the first threshold, enabling transmission of all second-priority bit streams destined for the logical address of the port card previously under flow control;

(d) if the buffer occupancy exceeds a fourth threshold greater than a third threshold, then disabling transmission of all first-priority bit streams destined for at least one corresponding logical address of the port card until the buffer occupancy drops below the third threshold;

(e) if the buffer occupancy drops below the third threshold, enabling transmission of all first-priority bit streams destined to the logical address of the port card previously under flow control;

(f) determining whether the destination logical address of a received bit stream received by the port card is a multicast address;

(g) maintaining a list at the port card of all flow controlled bit streams whose destination logical address is a multicast address;

(h) disabling the transmission of all bit streams destined to the physical address of a port card having a buffer occupancy greater than a fifth threshold;

(i) if the buffer occupancy drops below the third threshold, enabling transmission of all first-priority bit streams destined to the physical address of the port card; and (j) the buffer occupancy drops below the first threshold, enabling transmission of all second-priority bit streams destined to the physical address of the port card.

2. A flow control method as set forth in claim 1 further comprises the step of:

examining a sequence of packet arrivals corresponding to each of the bit stream and controlling the bit stream or bit streams in the order of the packet arrivals.

3. A flow control method as set forth in claim 1 wherein transmission of a multicast bit stream is disabled if one or more port cards receiving said multicast bit stream transmits a flow control signal to disable transmission of said multicast bit stream.

4. A flow control method as set forth in claim 1 wherein said enabling transmission steps further comprise the steps of:

determining whether any of said received bit streams previously under flow control were unicast or multicast transmissions;

for all unicast transmissions, transmitting a RESUME packet to itself, said RESUME packet including a flow control signal to deactivate control of all bit streams having a first priority and destined to the physical address of the port card; and for all multicast transmissions, transmitting a RESUME packet to the logical multicast address, said RESUME packet including a flow control signal to deactivate control of all bit streams having the first priority and destined to said logical multicast address.

5. A flow control method as set forth in claim 1 wherein enabling transmission of a multicast bit stream requires a flow control signal indicating that each receiving port card of said multicast bit stream has sufficient buffer space to receive said multicast bit stream.

6. A flow control method as set forth in claim 4, further comprising the steps of:

monitoring data flow at a sending port card for a flow control signal;

if the flow control signal indicates disabling all bit streams to a second physical address and a second priority, then mapping all destination logical addresses for bit streams at said sending port card queued for transmission to said second physical address and disabling transmission of all bit streams having logical addresses mapped to said second physical address at said sending port card;

if the flow control signal indicates disabling transmission of a bit stream destined to a third logical address and having a third priority then disabling transmission of all bit streams having said third logical address and the third priority;

if the flow control signal indicates enabling transmission of a bit stream destined to a fourth physical address and having a fourth priority, then enabling transmission of all bit streams having logical addresses mapped to said fourth physical address and having the fourth priority; and if the flow control signal indicates enabling transmission for bit streams destined to a fifth logical address and having a fifth priority, then enabling transmission of all bit streams destined to said fifth logical address and having the fifth priority.

* * * * *